United States Patent [19]

Bradley et al.

[11] Patent Number: 4,951,194
[45] Date of Patent: Aug. 21, 1990

[54] METHOD FOR REDUCING MEMORY ALLOCATIONS AND DATA COPYING OPERATIONS DURING PROGRAM CALLING SEQUENCES

[75] Inventors: Alan C. Bradley, Portland; Steven R. Vegdahl, Beaverton; Norman I. Adams, Portland, all of Oreg.

[73] Assignee: Tektronix, Inc., Beaverton, Oreg.

[21] Appl. No.: 299,581

[22] Filed: Jan. 23, 1989

[51] Int. Cl.⁵ .............................................. G06F 12/02
[52] U.S. Cl. ................................. 364/200; 364/244.3; 364/254.6; 364/260.6; 364/261.2
[58] Field of Search ... 364/200 MS File, 900 MS File, 364/300

[56] References Cited

U.S. PATENT DOCUMENTS

| | | | |
|---|---|---|---|
| 3,878,513 | 4/1975 | Werner | 364/200 |
| 4,459,658 | 7/1984 | Gabbe et al. | 364/200 |
| 4,530,049 | 7/1985 | Zee | 364/200 |
| 4,546,431 | 10/1985 | Horvath | 364/200 |
| 4,719,565 | 1/1988 | Moller | 364/200 |

*Primary Examiner*—Thomas C. Lee
*Attorney, Agent, or Firm*—Daniel J. Bedell

[57] ABSTRACT

Segments of memory are allocated to a stack cache as needed to accommodate additional continuation frames during execution of a program. When a continuation is captured, flags in all segments of the stack cache are set to indicate the signals are shared by a captured continuation, the top segment of the stack cache is copied, and the copy is made the top continuation frame of the stack cache. To invoke a continuation, the top segment of the invoked continuation is copied into the current stack cache segment. When the stack cache is ready to underflow into a segment shared by a captured continuation, the shared segment is copied and the stack cache underflows into the copy.

6 Claims, 8 Drawing Sheets

METHOD FOR REDUCING MEMORY ALLOCATIONS AND DATA COPYING OPERATIONS DURING PROGRAM CALLING SEQUENCES

BACKGROUND OF THE INVENTION

The present invention relates in general to program control methods and in particular to a method for allocating memory to a stack cache and for capturing and invoking continuations.

Many computer application programs include a main routine and a set of subroutines. The main routine calls subroutines in some predetermined order, and each subroutine carries out some particular set of operations when called, including, for example, calling another subroutine. When a subroutine completes its operation, it "returns" to its caller by redirecting program operation back to a next instruction of the calling routine.

Figure 1:
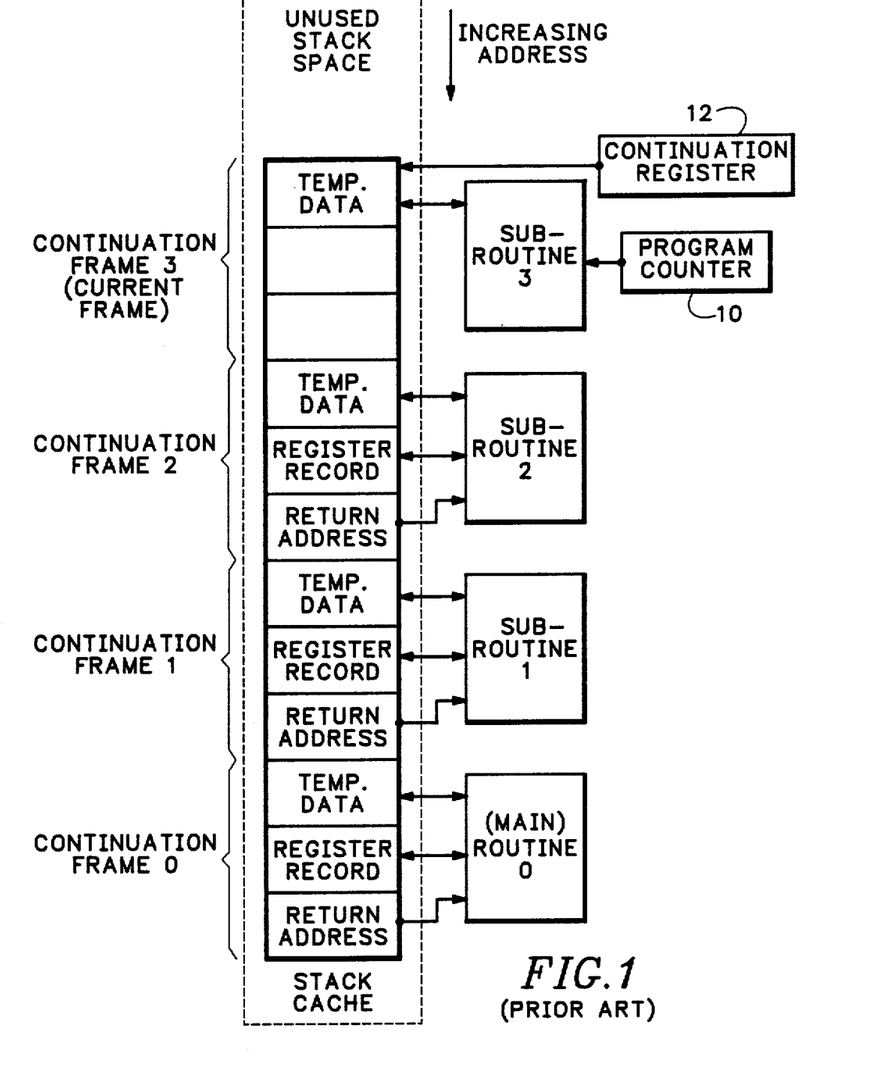
FIG. 1 is a block diagram illustrating an example stack of the prior art.

A computer processor typically includes a set of internal registers for storing data, but since the processor usually does not have enough registers to store all intermediate data results of a routine, programs reserve an area of random access memory called a "stack" for storing such data. FIG. 1 illustrates a typical stack. A portion of the stack ("frame 0") is allocated for use by the main routine of the program. Frame 0 includes a set of memory locations for storing temporary data generated by the main routine. Before the main routine calls a first subroutine (subroutine 1), the main routine stores the memory address (the "return address") of the next main routine instruction executed when subroutine 1 returns to its caller. The main routine also stores a record of the current contents of the various other internal registers of the microprocessor in another portion (the "register record") of frame 0 before making the subroutine call.

When the main routine called subroutine 1, another area of the stack, frame 1, is reserved for subroutine 1. Subroutine 1 thereafter called subroutine 2. But before calling subroutine 2, subroutine 1 also stored its return address and a record of the contents of processor registers in frame 1. As illustrated in FIG. 1, subroutine 2 subsequently called a subroutine 3. A program counter 10 (an internal register of the processor) points to the instruction of subroutine 3 now in execution.

Note that for each routine 0–3, a corresponding frame 0–3 in the stack was reserved. The stack frames may not all be the same size since various routines have different storage requirements for temporary data. A stack pointer register 12 points to the top address of the single active frame.

When subroutine 3 ends, stack space was de-allocated by changing the contents of stack pointer register 12 to point to an address at the top of frame 2. Thus, during further execution of subroutine 2, should subroutine 2 call another subroutine, stack memory space previously allocated to frame 3 is used by the newly called subroutine.

The current state of the stack of FIG. 1 tells us that the processor is now executing subroutine 3, that subroutines 0–2 are now suspended, and that after the processor completes executing subroutine 3, the processor will successively finish executing routines 2, 1, and 0 starting at the return addresses contained in frames 2, 1 and 0. Thus, the stack in some sense is a record showing a future course of program execution.

Some programming languages allow routines to capture and invoke continuations. A "continuation" is a record of the stack as of some moment. For example, when a routine "captures" a continuation, a prior art system may copy the entire contents of the stack and store the copy as a "continuation" in another portion of memory (the "heap"). When a routine invokes (or "throws") a continuation, the current contents of the stack are replaced with a previously captured continuation and program execution resumes with the instruction at the return address included in the top frame of the new stack.

The ability to capture and invoke a continuation permits a program in execution to "save" a record of its future course of action and to re-embark on that future course of action at a later time. Some systems use this control mechanism to save the current state of a program in execution and to subsequently return to that state in response to an interrupt event. Continuation capturing and invoking is also used in multitasking systems to switch between multiple concurrent tasks. Object-oriented programming systems such as Smalltalk employ a continuation (also called a "context") to save the state of an interpreter executing one method before suspending execution of the method and executing some other method. Although the ability to capture and invoke continuations is helpful, the acts of capturing and invoking continuations may be time and memory consuming if the continuations are long.

When continuations have "unlimited extent", they may remain in the memory indefinitely, and a program that captures contexts often may quickly run out of memory space. Therefore, most systems employ some "garbage collection" method for reclaiming memory space occupied by continuations when no longer needed. (A continuation is no longer needed when there is no possibility that the system will execute a suspended routine referencing the continuation.) However, a garbage collector can consume much processing time, causing unacceptable delays ("latency periods") in program execution.

SUMMARY OF THE INVENTION

The present invention relates to a system of the type wherein memory is allocated to a stack cache in the form of one or more equal sized stack cache segments. Each "segment" is an area of a memory storing one or more continuation frames, and each segment of the stack cache, other than a "root" segment, includes a "link", a pointer to a preceding segment of the stack cache. A pointer in a stack cache register indicates the top segment of the stack cache (the "current" stack cache segment), containing the continuation frame associated with a routine now in execution (the "current continuation frame"). A "continuation register" points to the current continuation frame. The stack cache spans a set of linked segments of heap-based memory. When there is insufficient space remaining in the current stack cache segment to store a continuation frame for a called routine, a new stack cache segment is allocated in the memory, the new segment being linked to the current stack cache segment, and a portion of the new stack cache segment being allocated to the new continuation frame. The content of the stack cache register is then altered to point to the new stack cache segment, and the content of the continuation register is altered to point to the new continuation frame.

In accordance with an aspect of the invention, each new stack cache segment includes space for storing a "shared" flag initially set false when the stack cache segment is created. When a routine captures a continuation, the shared flags of all segments of the stack cache are set true to indicate a captured continuation shares these segments with the stack cache. A new segment is then allocated, the current stack cache segment is copied into the new segment, and the new segment becomes the current stack cache segment. Thus, when capturing a continuation, only the top segment of the stack cache is copied.

When a routine in execution invokes a continuation, the top segment of the invoked continuation is copied into the current stack cache segment so that the top continuation frame becomes the current continuation frame. The routine then jumps to the return address specified in the current continuation frame. Thus, only the top segment of an invoked continuation is copied.

Since the operations of capturing and invoking continuations require copying only a top continuation frame of the stack cache or a continuation, the present invention minimizes latency periods associated with capturing and invoking long continuations. In addition, the present invention makes efficient use of memory by segmenting the stack cache and continuations and permitting them to share common segments. Finally, by minimizing the amount of memory used to store continuations traversed by garbage collectors, the present invention reduces latency periods associated with garbage collection.

It is accordingly an object of the invention to provide an improved method for capturing and invoking continuations providing minimal delay in program execution.

It is a another object of the invention to provide an improved method for efficiently allocating memory to continuations.

It is a further object of the invention to provide an improved method for storing continuations in a way that minimizes the time required for garbage collection.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

DESCRIPTION OF THE PREFERRED EMBODIMENT

A stack cache is a set of continuation frames where each continuation frame is an area of memory used by a separate routine of a program in execution for storing data. The continuation frame used by the routine now in execution is called the "current" continuation frame. Before a routine in execution calls another, it stores a return address and the contents of various processor registers in its continuation frame. In response to the subroutine call, execution of the calling routine is suspended and a new current continuation frame for the called routine is established. When the called routine returns to its caller, the continuation frame used by the calling routine again becomes the current continuation frame and the computer resumes executing the calling routine at the instruction stored at a return address contained in the current continuation frame. Upon resumption, the calling routine usually restores the contents of various processor registers to the values previously stored in its continuation frame.

The present invention relates to a time and memory efficient method for allocating memory to a stack cache and for capturing, storing and invoking continuations. A continuation is a record of the state of the stack cache as of a particular moment, and a routine in execution may "capture" a continuation by storing the current state of the stack cache. When a routine "invokes" a previously captured continuation, it restores the stack cache to the state indicated by the invoked continuation.

The stack cache and each captured continuation represent alternative "futures" for a program in execution since the order of the continuation frames of a stack cache or a continuation suggests an order of reactivation of suspended routines. A routine in execution may select a new "future" course of program execution by invoking a previously captured continuation. The ability to capture and invoke continuations permits a program to store a record of its current state and future course of action and to later return to that state and re-embark on that course of action, regardless of what actions may have occurred between capturing and invoking the continuation. A program may employ such a control mechanism, for example, to restore itself to some previous point in its course of execution in response to an event driven interrupt.

Figure 2:
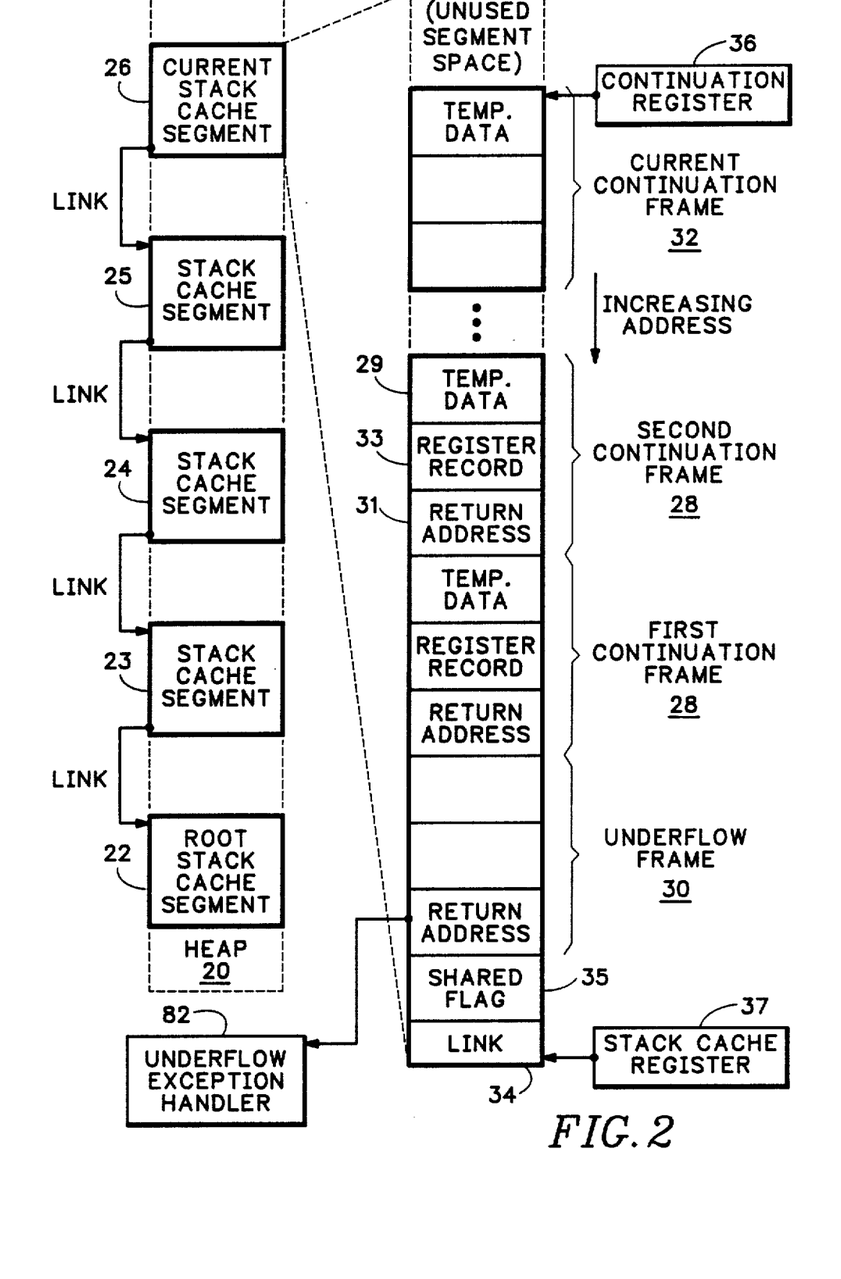
FIG. 2 is a block diagram illustrating an example stack cache in accordance with the present invention.

FIG. 2 illustrates a stack cache 20 arranged in accordance with the present invention. Stack cache 20 comprises a set of equal sized stack cache segments 22-26. Each stack cache segment is a set of contiguously addressed storage locations in memory, and the new segments are allocated to the stack cache as required. Although each stack cache segment spans a set of contiguous memory addresses, the various stack cache segments may not be contiguous to one another. A "root" stack cache segment 22 is the first segment added to the stack cache. A "current" stack cache segment 26 is the last segment added to the stack cache. FIG. 2 illustrates the internal organization of the current stack cache segment 26, but other stack cache segments 22-25 are substantially similar in internal organization.

Each stack cache segment stores one or more continuation frames 28 and an "underflow" frame 30. Each called routine of a program uses a separate continuation frame 28 to store temporary data 29. The routine now in execution uses the topmost (last added) continuation frame of the current stack cache segment, called the "current" continuation frame 32. All other continuation frames 28 of the current stack cache segment 26 and all continuation frames of all other stack cache segments 22-25 are used by other routines now suspended and awaiting return of called routines.

The first executed routine of a program (sometimes called the "main" routine) used the first continuation frame of the root stack cache segment 22. When the main routine called another routine, a next portion of the root stack cache segment was allocated as a second continuation frame. In response to later calls, more continuation frames were added to the root stack cache segment 22. When the root stack cache segment had insufficient remaining space to accommodate a continuation frame for a next called routine, another portion of memory was allocated for another stack cash segment 23 and a portion of segment 23 was allocated to the new continuation frame. In response to additional calls, more continuation frames were added to stack cache segment 23. When stack cache segment 23 was filled with continuation frames, stack cache segment 24 was added. As illustrated in FIG. 2, the stack cache has grown to five stack cache segments with portions of the current segment 26 being allocated to several continuation frames 28 including the current continuation frame 32.

Before a routine in execution calls another routine, the calling routine suitably stores a return address 31 and record 33 of the contents of various processor registers in its continuation frame. To implement the call, a new continuation frame is added to the stack cache for the called routine and the new continuation frame becomes the current configuration continuation frame. When the called routine returns to the calling routine, the continuation frame used by the calling routine becomes the current continuation frame and the suspended calling routine is reactivated starting with the instruction stored in memory at return address 31.

As previously mentioned, each stack cache segment 22-26 spans a contiguous set of memory addresses, but segments 22-26 are not necessarily contiguous to one another. The order of the segments within the stack cache is recorded by storing a "link" 34 in each stack cache segment other than the root segment 22. The link is a pointer to a preceding segment of stack cache 20. For example, the link in stack cache segment 26 points back to stack cache segment 25 and the link in stack cache segment 25 points back to stack cache segment 24.

In the preferred embodiment, the link 34 occupies the highest address of the continuation frame. A "shared flag" 35 (discussed hereinbelow) occupies the next highest address. The underflow frame 30 occupies a next higher set of addresses. As continuation frames 28 are allocated within a stack cache segment, each successive continuation frame occupies a lower set of memory addresses within the segment. The "top" continuation frame of a stack cache segment is the last continuation frame stored in the stack cache segment but occupies the lowest set of occupied addresses of the segment. A "stack cache" register 37 of the computer processor points to the highest address of the current stack cache segment 26, and a "continuation" register 36 of the processor points to the lowest address of the current continuation frame 32. When a routine in execution seeks to access some particular address in the current continuation frame 32, the routine references the particular address by specifying the offset between the pointer address in the continuation register 36 and the particular address.

Since a captured continuation is a record of the stack cache at some point in time, every captured continuation looks like a stack cache comprising a set of one or more linked segments. Moreover, the stack cache and the various captured continuations may "share" many of the same memory segments. The linked segments of the stack cache and all captured continuations form a tree-like continuation structure as illustrated, for example, in FIG. 3.

Figure 3:
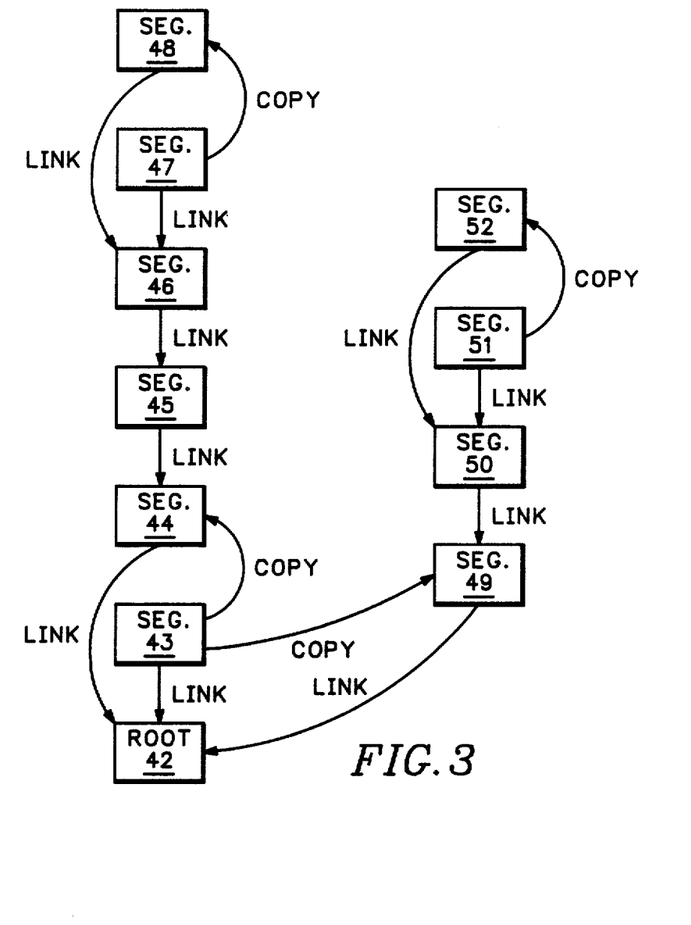
FIG. 3 is a block diagram illustrating an example combined continuation and stack cache structure in accordance with the present invention.

In the example of FIG. 3, the stack began with a root stack cache segment 42, and stack cache segment 43 was added after the root segment 42 was filled with continuation frames. Later, the routine using the top continuation frame of stack cache segment 43 captured a continuation including stack cache segments 42 and 43 by calling a capture handling routine. The capture handling routine set the "shared" flag 35 (FIG. 2) of each segment 42 and 43 of the stack cache true to indicate these stack cache segments are included in a captured continuation. The capture handling routine also initialized a new stack cache segment 44 and made segment 44 the current segment of the stack cache. On return of the capture handling routine, an underflow handling routine was called. The underflow handling routine copied stack cache segment 43 into stack cache segment 44 and set the shared flag of stack cache segment 44 false. At that point, the stack cache consisted of stack cache segments 42 and 44 and the captured continuation consisted of stack cache segments 42 and 43. But since stack cache segment 44 was a copy of stack cache segment 43, the stack cache (segments 42, 44) is similar to the captured continuation (segments 42, 43) except that the shared flag in stack cache segment 44 is false while the shared flag in stack cache segment 43 is true. Note that in "capturing" the continuation (segments 42, 43), only the current stack cache segment 43 of the stack cache was copied. The captured continuation and the stack cache "share" stack cache segment 42.

Thereafter, in response to many additional subroutine calls, the system filled unused portions of stack cache segment 44 with additional continuation frames and added stack cache segments 45-47. A routine using a top continuation frame of stack cache segment 47 then captured a continuation including stack cache segments 42 and 44-47 by calling the capture handling routine. The capture handling routine set the shared flags of each stack cache segment 44-47 true to indicate these segments are now included in a captured continuation. The capture handling routine also initialized a new stack cache segment 48 and made segment 48 the current segment of the stack cache. On return of the capture handling routine, the underflow handling routine copied stack cache segment 47 into stack cache segment 48 and set the shared flag of segment 48 false. The stack cache then consisted of stack cache segments 42, 44-46 and 48, substantially identical to the captured continuation (segments 42, 44-46 and 47) because segment 48 is a copy of segment 47. However, the shared flag in stack cache segment 48 is false, while the shared flag in stack cache segment 47 is true. Again, note that in capturing the continuation, only the current segment 47 of the stack cache was copied.

After the system added more continuation frames to stack cache segment 48, a routine associated with a top continuation frame of stack cache segment 48 captured another continuation (segments 42, 44-46, and 48). In carrying out the capture, a new current stack cache segment 49 was allocated. Segment 49 initially contained a copy of the content of stack cache segment 48 and included a link pointing back to stack cache segment 46 as the next segment of the stack cache. However, the routine using the top continuation frame of stack cache segment 49 thereafter invoked the continuation comprising segments 42 and 43 by calling an "invocation handler" routine. The invocation handler copied the contents of stack cache segment 43 into stack cache segment 49 and set the shared flag of stack cache segment 49 false. At that point, the stack cache consisted of segments 42 and 49. Note again that in invoking the continuation, only the top segment 43 of the continuation was copied.

The system added segments 50 and 51 to the stack cache (segments 42 and 49) later in program execution. A routine using the top continuation frame of stack cache segment 51 then captured the stack cache. Following the capture, a new current stack cache segment 52 was established, segment 52 containing a copy of the content of stack cache segment 51 including a link pointing back to stack cache segment 50.

The stack cache now consists of segments 42, 49, 50 and 52, and the program has captured the following continuations identified by the segments included therein:

| Continuation | Segments |
|---|---|
| 1 | 42 and 43 |
| 2 | 42 and 44-47 |
| 3 | 42, 44-46 and 48 |
| 4 | 42, and 49-51 |

Note the stack cache and all continuations share the root stack cache segment 42 and that various continuations share several other stack cache segments. Prior art systems typically capture continuations by copying the entire stack cache from a stack area of memory to a heap area of memory. Thus, in such prior art systems, captured continuations require more memory space. Moreover, since such prior art systems copy the entire stack cache to capture a continuation, the latency period (the delay in program execution) during continuation capture, can be long when the stack cache is large. Since in the present invention only the top segment of the stack cache need be copied during continuation capture, the latency period during continuation capture is much shorter, particularly when the stack cache is long. Similarly, since prior art systems copy the entire continuation from the heap to the stack when invoking a continuation, the invocation latency period can be long when the invoked continuation is large. However, in the present invention, since only the top segment of an invoked continuation need be copied, program execution latency during the invocation process is also much shorter.

Figure 4:
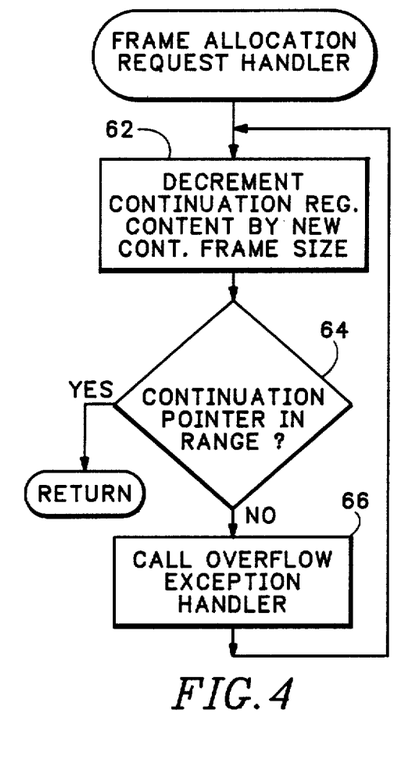
FIG. 4 is a flow chart illustrating a continuation frame allocation request handler routine.
Figure 5:
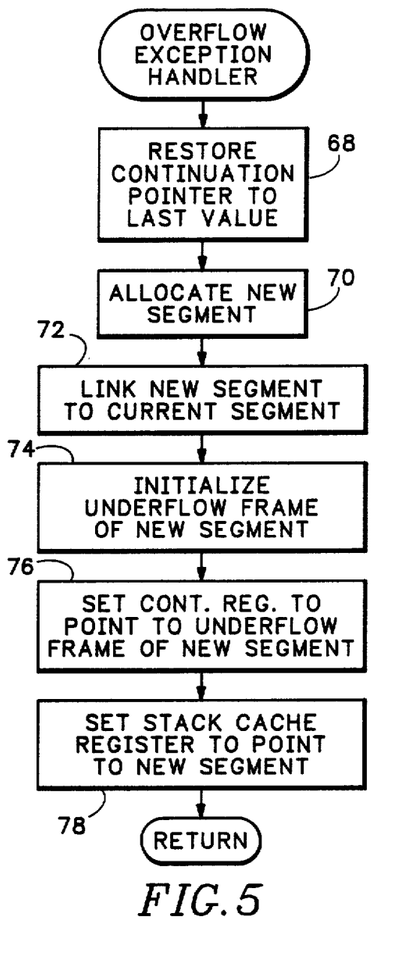
FIG. 5 is a flow chart illustrating an overflow exception handler routine.

FIGS. 4 and 5 illustrate a continuation frame allocation request handler and an overflow exception handler. The frame allocation request handler is executed in response to a subroutine call to establish a new continuation frame for the called subroutine. When there is sufficient room remaining in the current stack cache segment for allocation as the new continuation frame, the request handler allocates the new continuation frame within the current stack cache segment. However, when the request handler finds insufficient space remaining in the current stack cache segment to store the new continuation frame, the request handler calls the overflow exception handler of FIG. 5 to initialize a new stack cache segment and then allocates a portion of the new segment as the new continuation frame.

Referring to FIG. 4, the frame allocation request handler first decrements the pointer in the continuation register by an amount equal to the required size of the new continuation frame (step 62). The request handler thereafter checks whether the continuation pointer is within the range of memory addresses spanned by the current stack cache segment (step 64). If so, the act of decrementing the pointer in the continuation register effectively allocates the new continuation frame within the current stack cache segment and establishes the new continuation frame as the current continuation frame. In such case, the request handler returns to its caller. However, when the routine finds the continuation pointer out of range at step 64, the new continuation frame is too large to fit in the unused space remaining in the current stack cache segment and the request handler calls the overflow exception handler of FIG. 5 to allocate a new stack cache segment (step 66).

Referring to FIG. 5, the overflow exception handler (at step 68) initially restores the pointer in the continuation register to its previous value to point to the bottom address of the current continuation frame. Thereafter, the overflow exception handler allocates a new segment of memory to the stack cache (step 70) and stores a link in the highest address of the new stack cache segment (step 72). The link points back to the current stack cache segment. The overflow exception handler then initializes the underflow continuation frame of the new stack cache segment (step 74) and sets the continuation register pointer to point to the top (the lowest address) of the underflow continuation frame of the new stack cache segment (step 76). The handler thereafter sets the stack cache register to point to the bottom (the highest address) of the new stack cache segment (step 78). The new segment becomes the current stack cache segment and the overflow exception handler returns to the frame allocation request handler.

The frame allocation request handler thereafter repeats steps 62 and 64, decrementing the continuation pointer by the size of the new continuation frame to allocate space in the new segment to the new continuation frame. The continuation frame allocation handler then returns.

When the system completes executing a routine associated with the current continuation frame, the return address stored in the preceding frame of the current stack cache segment indicates where the computer begins executing instructions. The bottom frame of each stack cache segment is always the "underflow" frame 30 of FIG. 2. The underflow frame includes a return address 80 pointing to an underflow handling routine 82. Accordingly, when the frame preceding the continuation frame used by a returning routine is the underflow frame, the system first executes the underflow routine 82 rather than the routine that called the returning routine.

Figure 6:
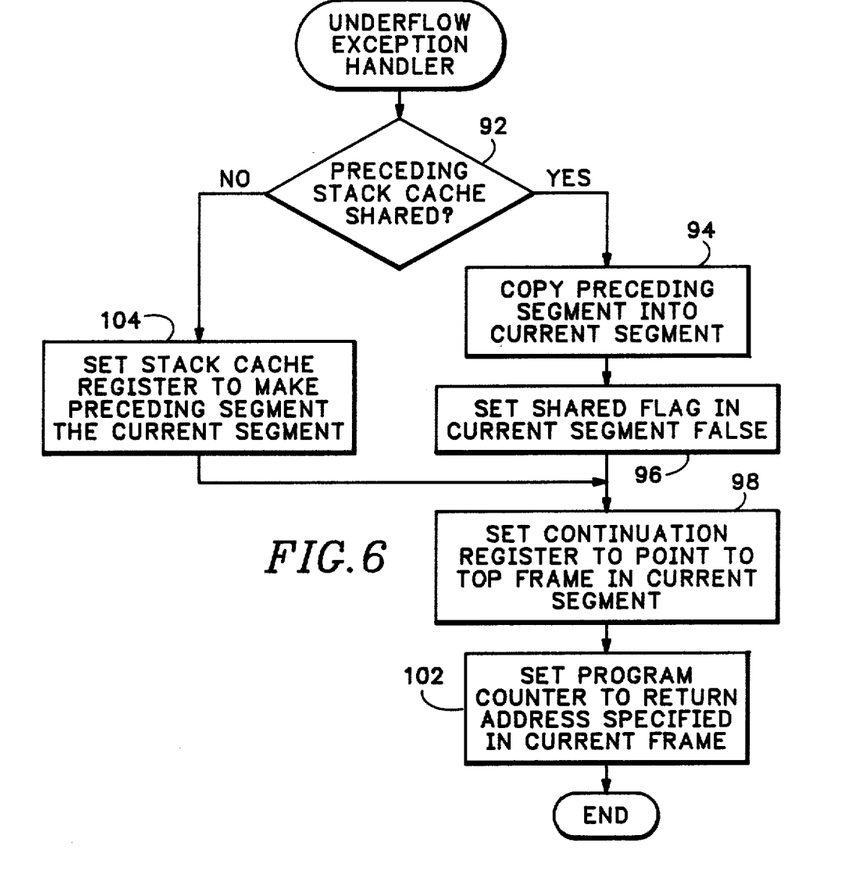
FIG. 6 is a flow chart illustrating an underflow exception handler routine.

FIG. 6 illustrates the underflow handling routine and FIGS. 7A-7D illustrate changes to a stack cache during operation of the underflow exception handler of FIG. 6.

Figure 7A:
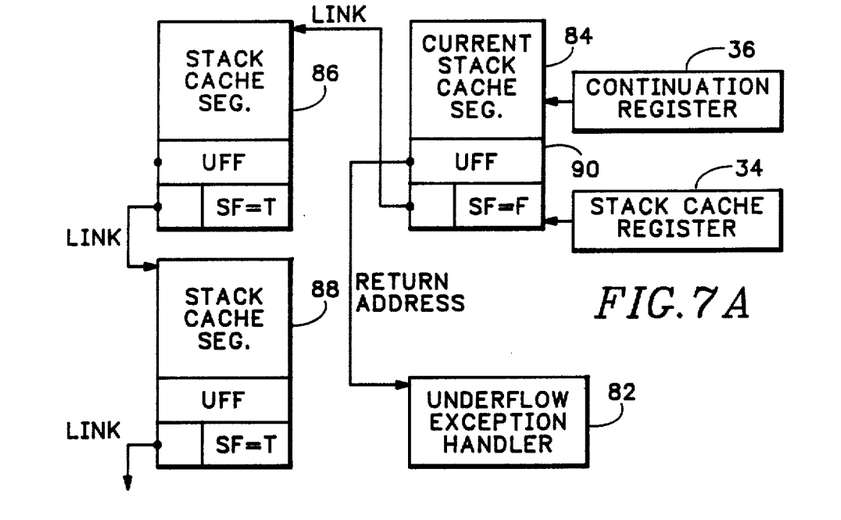
FIGS. 7A-7D are block diagrams illustrating operation of the underflow exception handler routine of FIG. 6.

FIG. 7A illustrates the top three stack cache segments 84, 86 and 88 of a stack cache. Segment 84 is the current stack cache segment and includes a link pointing back to preceding segment 86. Segment 86 includes a link pointing back to its preceding stack cache segment 88, and segment 88 includes a link pointing back to its preceding segment of the stack cache (not shown).

Stack cache register 37 points to current stack cache segment 84, and continuation register 36 points to a current continuation frame within stack cache segment 84. The return address stored in underflow frame 90 within the current stack cache segment 84 points to underflow exception handler 82. The shared flag (SF) of stack cache segment 84 is false, indicating the stack cache segment is not shared by a captured continuation. In this example, the shared flags of stack cache segments 86 and 88 happen to be true because they happen to be shared by a previously captured continuation.

Assume a routine in execution using the current (top) continuation frame within the current stack cache segment 84 returns to its caller. To implement the return, the system simply sets the pointer in the continuation register to point to the preceding continuation frame with stack cache segment 84 and starts executing instructions of the calling routine beginning with the instruction at the return address referenced by the preceding continuation frame. (Note that if the calling routine subsequently calls another subroutine, the continuation frame allocation request handler of FIG. 4 reuses memory space in stack cache segment 84 directly above the current continuation frame, writing over the continuation frame used by the returned routine.)

On the other hand, when the current continuation frame in stack cache segment 84 is immediately above the underflow frame, the system responds to return of a routine using the current continuation frame by setting the continuation register 36 to point to the underflow frame 90 rather than to a continuation frame associated with a routine that called the returning routine. The computer therefore begins executing the first instruction of the underflow exception handler 82.

Figure 7B:
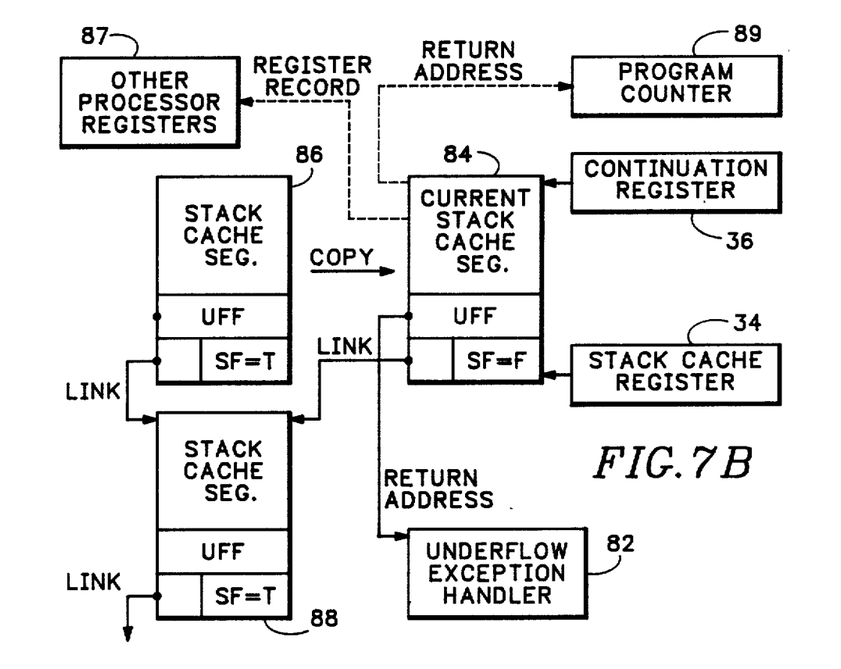

Referring to FIGS. 6, 7A, and 7B, the underflow exception handler first checks the link stored in stack cache segment 84 to locate the preceding stack cache segment 86 and checks whether the shared flag in the preceding segment is true (step 92). Finding the shared flag true, the underflow exception handler copies stack cache segment 86 into current stack cache segment 84 (step 94) as illustrated in FIG. 7B and immediately resets the shared flag in stack cache segment 84 false (step 96). The underflow exception handler then sets the continuation register 86 to point to the top continuation frame in stack cache segment 84 (step 98), making the top continuation frame the current continuation frame. The underflow exception handler thereafter sets the program counter 89 to the return address specified in the current continuation frame (step 102), thereby causing program execution to jump to the appropriate return address. The processor resumes executing the formerly suspended calling routine starting with the instruction stored at the return address.

Thus, when a program in execution "underflows" the current stack cache segment 84 into a shared segment, the underflow exception handler copies the preceding stack cache segment 86 into the current stack cache segment 84. Segment 84 continues to be the current stack cache segment, but its contents are changed to reflect the contents of the preceding stack cache segment 86. The continuation frames and other data formerly stored in stack cache segment 84 are written over. FIG. 7B shows that the link in stack cache segment 84 now points back to stack cache segment 88. The stack cache now comprises segments 84 and 88. Although shared segment 86 continues to be a part of various continuations, segment 86 is no longer included in the stack cache.

Figure 7C:
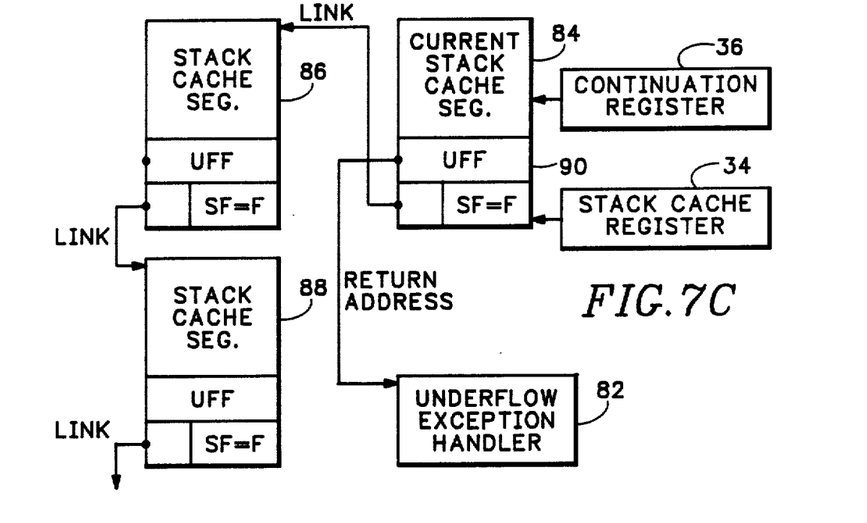
Figure 7D:
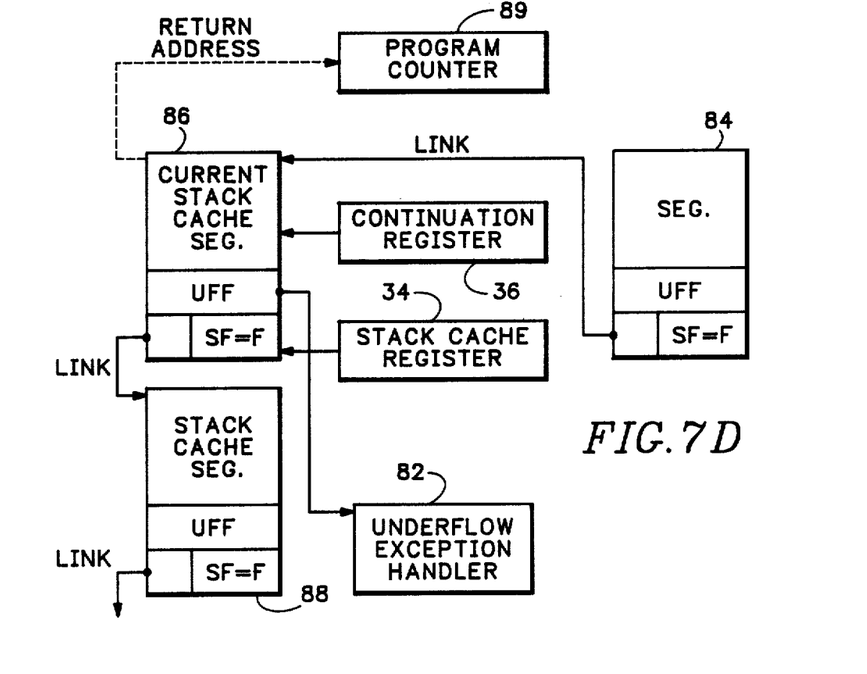

Assume now that the shared flags of stack cache segments 86 and 88 were false, as illustrated in FIG. 7C. This indicates stack cache segments 86 and 88 form portions of one or more previously captured continuations. Thus, when a routine associated with a bottom continuation frame in current stack cache segment 84 returns, the underflow exception handler finds an unshared preceding stack cache segment (segment 86) at step 92. Therefore, as illustrated in FIG. 7D, the underflow exception handler sets the pointer in stack cache register 34 to make the preceding stack cache segment 86 the current stack cache segment (step 104) and sets the pointer in continuation register 36 to point to the top continuation frame of the current stack cache segment 86 (step 98). The underflow exception handler then sets the program counter 89 to the return address specified in the current continuation frame (step 102). The processor thereupon resumes executing the calling routine starting with the instruction stored at the return address.

Thus, when the stack cache underflows into an unshared stack cache segment, the underflow exception handler simply makes the unshared stack cache segment the current stack cache segment. While a portion of the stack cache must occasionally be copied when underflowing into a shared segment, only a single stack cache segment need be copied. The latency in program execution due to such copying is small.

Figures 8, 9:
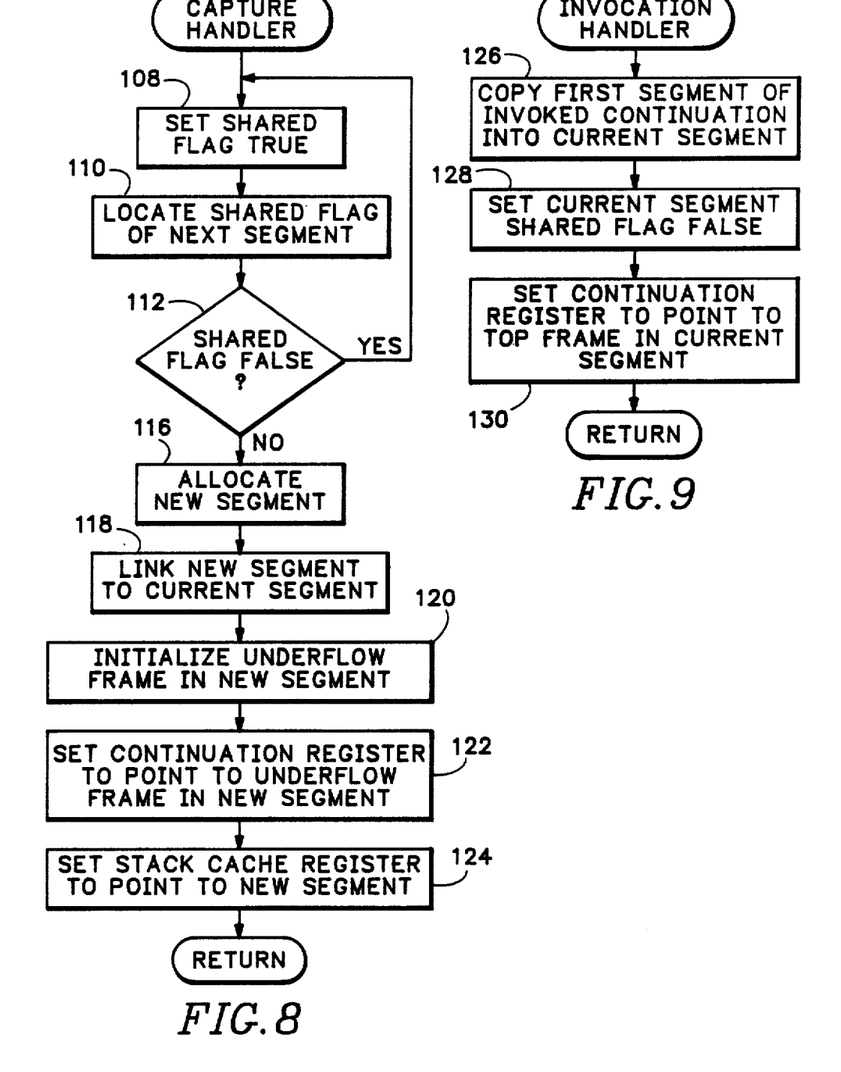
FIG. 8 is a flow chart illustrating a capture handler routine.
FIG. 9 is a flow chart illustrating an invocation handler routine.

When a routine in execution captures a continuation, the capture handler routine illustrated in FIG. 8 is executed. Starting at step 108, the capture handler sets the shared flag of the current stack cache segment true and then follows the link in the current stack cache segment to locate the next preceding segment of the stack cache (step 110). If the shared flag of the located stack cache segment is false (step 112), the capture handler returns to step 108 and sets the flag true. The capture handler continues to loop through steps 108, 110, and 112, traversing links through the stack cache to locate successive stack cache segments and setting the shared flag of each segment located true until, at step 112, the capture handler encounters a flag that is already true. At that point, the capture handler allocates a new stack cache segment (step 116), stores a link in the new segment pointing back to the current stack cache segment (step 118), and initializes an underflow continuation frame in the new segment (step 120). The capture handler sets the continuation register to point to the underflow continuation frame of the new segment (step 122) and sets the stack register to point to the new segment (step 124), thereby making the new segment the current stack cache segment. The capture handler thereupon returns.

When the capture handler returns, the current stack cache segment underflows into its underflow frame, and the underflow handler of FIG. 6 is invoked. As previously discussed, the underflow handler copies the preceding segment of the stack cache into the current stack cache segment, sets the shared flag in the current stack cache segment false, makes the top continuation frame of the current stack cache segment the current continuation frame, and stores the return address of the current continuation frame in the program counter. The processor then resumes executing the routine that initiated the capture. Thus, only the current segment of the stack cache is copied when capturing a continuation.

When a routine in execution invokes a continuation, the invocation handler routine illustrated in FIG. 9 is invoked. Starting at step 126, the invocation handler copies the top segment of the invoked continuation into the current stack cache segment. The invocation handler then sets the shared flag in the current stack cache segment false (step 128) and sets the continuation register to point to the top continuation frame of the current stack cache segment (step 130). The return address stored in the top continuation frame is loaded into the program counter when the invocation handler returns so that the processor resumes executing the routine using the top continuation frame of the current stack cache segment. Thus, only the top segment of a continuation is copied when invoking a continuation.

Captured continuations may have "unlimited extent". Once captured, they may remain in memory indefinitely. Since a program often capturing contexts may quickly run out of memory space, it is advisable to employ some "garbage collection" method for reclaiming memory space occupied by unneeded continuations. A continuation is no longer needed when there is no possibility that the system will complete execution of a routine referencing the continuation. Some prior art systems use a garbage collector periodically traversing the stack cache and all continuations to locate all routines callable in the future. The garbage collector then checks these routines to ascertain the continuations they reference. When no routine references a continuation, the garbage collector destroys the continuation by de-allocating the memory space storing the continuation. When used in prior art systems storing many continuations, garbage collection causes long latency periods in program execution. However, since in accordance with the present invention the stack cache and the various continuations share many segments, the garbage collection search is more limited and the latency period caused by garbage collection is greatly reduced.

Thus as described herein, segments of memory are allocated to the stack cache as needed to accommodate additional continuation frames required during execution of a program. To capture a continuation, shared flags in all segments of the stack cache are set true when not already true, the top segment of the stack cache is copied, and the copy is made the current continuation frame of the stack cache. To invoke a continuation, the top segment of the invoked continuation is copied into the current stack cache segment. Since only a single stack cache segment need be copied when capturing or invoking a continuation, the method of the present invention reduces latency periods in program execution. In addition, the method of the present invention makes efficient use of memory by segmenting the stack cache and continuations and permitting the stack cache and the continuations to share segments of memory storing common data. Finally, by eliminating duplication of continuation frames, the present invention improves the speed of marking type garbage collection.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. For a computer including a memory for storing data and a program comprising callable routines, and including a processor for executing the routines when called, wherein each routine uses a separate continuation frame allocated to a stack cache for storing data, each continuation frame comprising a separate portion of the memory, wherein a routine currently being executed by the processor uses a last continuation frame allocated to the stack cache, and wherein the last allocated continuation frame is de-allocated from the stack cache when the routine using it returns to its caller, a method for allocated continuation frames to a stack cache and for capturing and invoking continuations, wherein a continuation is a record of the state of the stack cache as of the moment the continuation is captured, and wherein invoking a continuation restores a stack cache to a state recorded by the invoked continuation, the method comprising the steps of:

allocating continuation frames to the stack cache by successively allocating segments of the memory to the stack cache, and allocating successive portions of allocated segments as continuation frames of the stack cache, a new segment being allocated to the stack cache whenever a last allocated segment includes no unallocated portion of size sufficient for allocation of a next allocated continuation frame of the stack cache;

storing a link in each new segment when allocated to the stack cache, the link comprising data pointing to a next to last allocated segment of the stack cache;

storing a shared flag in a new segment when allocated to the stack cache, the shared flag comprising data initially indicating the new segment is not included in a captured continuation; and capturing a continuation by setting shared flags in a set of segments allocated to the stack cache to indicate the segments are included in a captured continuation, allocating a new segment to the stack cache such that the last allocated segment becomes the next to last allocated segment of the stack cache and the new segment becomes the last allocated segment of the stack cache, copying data stored in the next to last allocated segment of the stack cache into the last allocated segment, and setting the shared flag in the last allocated segment to indicate the last allocated segment is not included in a captured continuation.

2. The method in accordance with claim 1 further comprising the step of invoking the captured continuation by copying data contained in a last allocated segment of the invoked continuation into a last allocated segment of the stack cache.

3. The method of claim 2 further comprising the step of setting a shared flag stored in said last allocated segment of the stack cache to indicate the last allocated segment of the stack cache is not included in a continuation.

4. For a computer including a memory for storing data and a program comprising callable routines, and including a processor for executing the routines when called wherein each routine uses a separate continuation frame allocated to a stack cache for storing data, each continuation frame comprising a separate portion of the memory, a method for allocating continuation frames to and de-allocating continuation frames from the stack cache and for capturing and invoking continuations, wherein a continuation is a record of the state of the stack cache as of the moment the continuation is captured, and wherein invoking a continuation restores a stack cache to a state recorded by the invoked continuation, the method comprising the steps of:

- allocating continuation frames to the stack cache by successively allocating segments of the memory to the stack cache, and allocating successive portions of each allocated segment as continuation frames of the stack cache, a new segment being allocated to the stack cache whenever a last allocated segment includes no unallocated portion of size sufficient for allocation of a next allocated continuation frame of the stack cache, the last allocated segment becoming a next to last allocated segment and the new segment becoming the last allocated segment;

- storing a link in each new segment when allocated to the stack cache, the link comprising data pointing to the next to last allocated segment of the stack cache;

- storing a shared flag in a new segment when allocated to the stack cache, the shared flag comprising data initially indicating the new segment is not included in a captured continuation;

- when a routine using a last allocated continuation frame of a last allocated segment returns and the last allocated continuation frame is not the only allocated continuation frame of the last allocated segment, de-allocating the last allocated continuation frame from the last allocated segment such that the next to last allocated continuation frame of the last allocated segment becomes the last allocated continuation frame of the last allocated segment;

- when a routine using a last allocated continuation frame of a last allocated segment returns and the last allocated continuation frame is the only allocated continuation frame of the last allocated segment, locating a next to last allocated segment of the stack cache referenced by the link stored in the last allocated segment, and reading the shared flag in the located next to last allocated segment of the stack cache, and when the shared flag read indicates the located next to last allocated segment is included in a captured continuation, copying data including the link stored in the located next to last allocated segment into the last allocated segment, but when the shared flag read indicates the next to last allocated segment is not included in a captured continuation, de-allocated the last allocated segment of the stack cache such that the located next to last allocated segment becomes the last allocated segment of the stack cache; and

- resuming execution of a routine using a last allocated continuation frame of the last allocated stack cache.

5. The method in accordance with claim 4 further comprising the step of capturing a continuation by setting shared flags in a set of segments allocated to the stack cache to indicate the segments are included in a captured continuation, allocating a new segment to the stack cache such that the new segment becomes the last allocated segment of the stack cache, copying data including the link stored in a next to last allocated segment of the stack cache into the last allocated segment, and setting the shared flag in the last allocated segment to indicate the last allocated segment is not included in a captured continuation.

6. The method in accordance with claim 5 further comprising the step of invoking the captured continuation by copying data including a link contained in a last allocated segment of the set of segments included in the invoked continuation into a last allocated segment of the stack cache and setting a shared flag stored in said last allocated segment to indicate the last allocated segment is not included in a captured continuation.

* * * * *